Feb. 28, 1956  J. A. STROBLE  2,736,227
QUICK CHANGE NUT WITH PIVOTED THREAD SEGMENTS
Filed Oct. 29, 1952
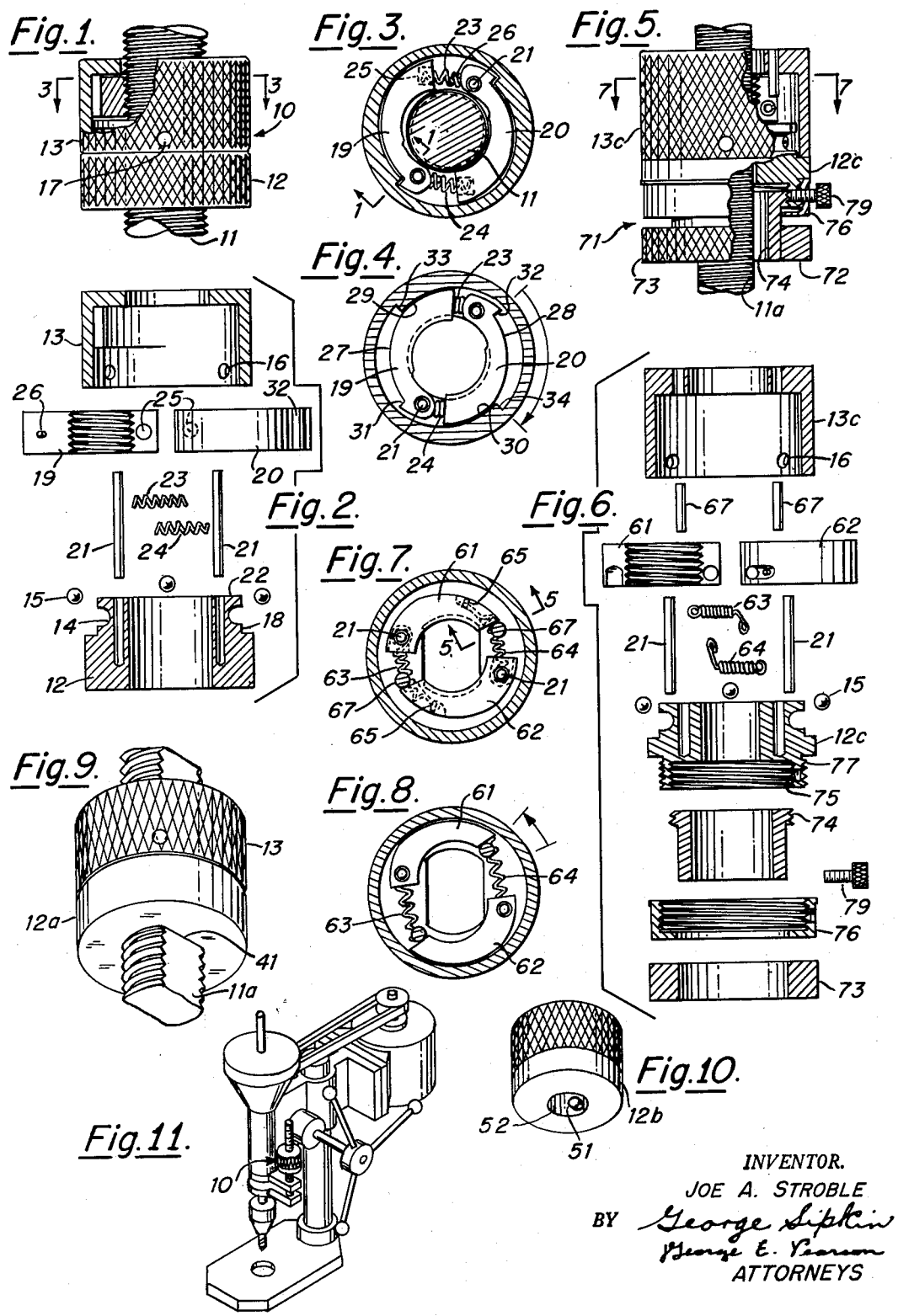
INVENTOR.
JOE A. STROBLE
BY George Sipkin
George E. Pearson
ATTORNEYS

United States Patent Office 2,736,227
Patented Feb. 28, 1956

2,736,227

QUICK CHANGE NUT WITH PIVOTED THREAD SEGMENTS

Joe A. Stroble, La Mesa, Calif.

Application October 29, 1952, Serial No. 317,609

1 Claim. (Cl. 85—33)

(Granted under Title 35, U. S. Code (1952), sec. 266)

The invention described herein may be manufactured and used by or for the Government of the United States of America for governmental purposes without the payment of any royalties thereon or therefor.

This invention relates to a quick release lock nut, and more in particular to a nut which may be effectively used as an adjustable stop on instruments such as a drill press wherein it is desired to limit the movement of a movable part.

It is an object of my invention to provide a nut that can be quickly released and slipped along a threaded shaft and quickly relocked at any desired place on the shaft.

It is a further object to provide a nut which normally is in thread engaging position and which may be quickly disengaged by a short angular movement thereof.

A still further object is to provide a nut which may be selectively engaged with or disengaged from the threads of a threaded shaft.

It is another object of the invention to provide a nut which may be quickly locked into a selected position and quickly unlocked therefrom.

Still another object is the provision of a movable stop device which may be quickly and easily moved from one position to another.

A further object is to provide a stop device having a coarse adjustment mechanism which may be quickly set and a further fine adjustment mechanism.

A still further object is to provide a quick release nut that is normally in a disengaging position, which may be quickly actuated into engaging position.

Other objects and many of the attendant advantages of this invention will be readily appreciated as the same becomes better understood by reference to the following detailed description when considered in connection with the accompanying drawings wherein:

Fig. 1 is a side view in partial section of an embodiment of the invention;

Fig. 2 is an exploded view of the embodiment shown in Fig. 1;

Figs. 3 and 4 are sectional views taken at 3—3 of Fig. 1 showing the parts in disengaging and engaging position, respectively;

Fig. 5 is a side view in partial section of a modification;

Fig. 6 is an exploded view of the modification shown in Fig. 5;

Figs. 7 and 8 are sectional views taken along 7—7 of Fig. 5 showing the parts in engaging position and disengaging position, respectively;

Fig. 9 is a further view in perspective of a further modification;

Fig. 10 is a view in perspective of a further modification;

Fig. 11 is a view in perspective of the invention in one of its applications.

Referring to the drawings, one embodiment of the invention is shown in Figs. 1-4 and 9, in which the nut generally indicated 10 is normally self-biased out of threaded engagement with a threaded shaft 11. The nut 10 is made up of two main parts 12 and 13 which are secured together for limited relative rotation by a groove and ball arrangement 14, 15, there being three equally spaced balls 15 which are admitted to the groove 14 through diametrical holes 16 provided in nut half 13. The balls 15 are thus positioned partly in the groove 14 and partly in the holes 16 individual thereto and each is retained in this position as by a dust cap 17 which may be held in place by soldering, peening over, or crimping over the edge around each cap 17.

Nut-half 13 is formed cup-shaped and is journaled on the stepped-down shoulder 18 of nut-half 12, and thus incloses the groove 14. Nut-half 13 also incloses a split nut comprising threaded dogs 19 and 20 which are threaded to match the threads on shaft 11 and are pivotally secured as by pins 21 to the face 22 of nut-half 12 whereby the dogs may be swung into and out of threaded engagement with the shaft 11.

As shown in Fig. 3, the dogs are normally urged out of threaded engagement with the shaft by a pair of coil springs 23 and 24, each of the springs being interposed between the heel of one of the dogs and the toe of the other. Each spring is seated at one end in an aperture 25 formed in the toe of one dog and is sleeved over a pin 26 carried at the heel of the other dog to exert a force directed substantially through pivot pins 21.

The outer surfaces of the dogs are cam-shaped as at 27 and 28 and are urged by springs 23 and 24 into matching engagement with complementary cam surfaces 29 and 30 respectively which are formed in diametrically opposed relation on the inner wall surface of nut-half 13.

In the operation of the foregoing described embodiment relative angular movement of the two nut-halves 12 and 13 in opposite directions, as by manual twisting of nut-half 13 clockwise relative to nut-half 12, cams the threaded dogs 19 and 20 into locking threaded engagement with shaft 11, as shown in Fig. 4, this camming action resulting from the interaction between the cam surfaces 27, 28 on the dogs 19 and 20 and the respective complementary cam surfaces 29, 30 on the inner surface of nut-half 13. Relative movement of the nut-halves and component parts in this direction is limited either by the engagement of the toe of each of the dogs with the heel of the other if the nut is not on a shaft, or, if on a shaft, by the engagement of the threads on the dogs with the threads on the shaft. Consequently the nut is ordinarily used and adjusted on a shaft having an effective diameter equal to or larger than the diametrical distance between the threaded surfaces of the two dogs at their inner radial limit, and may be locked as tightly as desired on the shaft by the amount of relative angular movement between nut-halves 12 and 13. Ordinarily, hand tightening provides sufficient locking between the nut and shaft to prevent loosening by reason of vibration, or the like, of associated equipment as for example a drill press upon which the nut and shaft assembly may be employed to selectively limit the depth of drilling.

Relative movement of the nut-halves in the opposite directions to that described above permits the dogs to ride in a radially outwardly direction on the cam surfaces 29 and 30 under the compressive force of springs 23 and 24 thereby to completely free the threads on the dogs from the threads on the shaft, as shown in Fig. 3. Relative movement of the nut-halves in this direction is limited by the stop surfaces 31 and 32 formed respectively on dogs 19 and 20, these stop surfaces engaging complementary stop surfaces 33 and 34 on cams 29 and 30. As indicated in Fig. 3, surfaces 31—34 will also provide a positive actuation of the dogs to release the threaded engagement thereof should the springs 23, 24 fail to act for any reason.

The nut 10 is thereby rendered free on the shaft and may be readily moved therealong to a new position without necessitating further angular movement of the nut until the desired new position is reached whereupon the nut may then be locked into position in the manner described above.

Thus the locking nut can be released with a simple twist of the fingers and slipped along the threaded shaft several inches or feet if desired and locked instantly with a simple twist of the fingers. If precision setting is required the nut 10 is slipped longitudinally as above described approximately to the desired position and the two nut halves are thereupon turned relatively to each other until the threads on the dogs effectively engage the threads on the shaft. The nut 10 is then turned as a unit angularly clockwise or counterclockwise whereby the interaction between the engaged threads moves the nut axially on the shaft in the usual manner of nut movement until the precise desired position is reached. If it is desired that the nut remain at this position the nut-halves 12 and 13 are then tightened by further rotation relative to each other to effectively lock the nut 10 to the shaft 11.

In Figs. 9 and 10 there are shown two modifications of the above described embodiment, unaltered parts being indicated by like numerals, wherein the nut is adapted to be locked, unlocked, and moved from one position to another by one hand instead of two hands as required in the previously described embodiment. This is accomplished in these modifications by providing the nut-halves 12a and 12b with means for preventing rotational movement thereof about a shaft 11a while allowing free axial movement along the shaft. In the modification shown in Fig. 9 as in Figs. 1–4, there is provided a non-threaded aperture 41 in nut-half 12a concentric to the aperture in nut-half 13 for sliding engagement with a shaft 11a. In this embodiment however the aperture 41 is made to conform substantially to the outer curvature of threaded shaft 11a which has two non-threaded flat diametrically opposed sides extending over its length. It will be apparent that this construction prevents rotation of nut-half 12a about the shaft 11a and that relative rotation between nut-halves 12a and 13 is accomplished merely by manually or otherwise rotating the nut-half 13. This leaves the other hand free to use as needed while an adjustment of the nut is made with one hand.

In the modification shown in Fig. 10 rotation of nut-half 12b is prevented by securing a flat ended set screw 51 having a flat end which extends into the concentric non-threaded aperture 52 thereof. The end of the set screw thus serves in the same manner as a flat side of the aperture 41 of the modification shown in Fig. 9 in cooperation with a flat side of shaft 11a to prevent relative rotation between the shaft and nut-half 12b. It will be apparent that if it were so desired the shaft 11a for use with this or the previous embodiment might have only one non-threaded flat side for prevention of relative rotation, or other means such as a pin and slot arrangement might be used for this purpose.

In the embodiment shown in Figs. 5–8 the threaded dogs 61, 62 are so arranged that they are normally biased into engaging position, and are selectively disengaged by relative rotation of the nut-halves 12c and 13c. This feature is desirable in this embodiment in order to leave both hands free for manipulation of a vernier adjustment mechanism generally designated 71 which is provided on this embodiment, and which is adjusted after a rough setting has been made by disengaging the dogs 61, 62, sliding the nut assembly to the approximately desired location and releasing it into locked thread engaging and locking relation with the shaft. However, as will be apparent, a normally disengaged dog construction, as in the embodiments of Figs. 1–4, might be used with a vernier adjustment if so desired, or the presently to be described modification might be used without a vernier as the need might arise.

In this embodiment the pivotally mounted dogs 61 and 62 are resiliently biased radially inwardly by a pair of tension springs 63, 64 each of which has its opposite ends secured on a lug 65 in the toe of one dog and the pivot pin 21 upon which the heel of the other dog is pivotally mounted. Since the toe of each dog 61, 62 has a longer radius arm than the heel thereof the toes will thus be normally biased radially inwardly, as shown in Fig. 7, by the springs 63, 64 whereby the nut will normally be in thread engaging position.

On the inner surface of the top portion of nut-half 13c is provided a pair of pins 67 which cooperate with the ends of the toes 61, 62 upon relative rotation of parts 12c and 13c (i. e. counter-clockwise movement of 13c relative to 12c as viewed from the outer end of 13c) to thereby cam the toes radially outward against the action of springs 63, 64, whereby the nut is effectively disengaged from the threads of the shaft.

As will be noted, in this embodiment relative rotation of the two nut-halves 12c and 13c is accomplished merely by turning the nut-half 13c, since nut-half 12c is provided with rotation prevention means in the form of a flat sided concentric aperture complementary to the shaft 11a as in the previously described modification shown in Figs. 9 and 10.

The vernier adjustment mechanism on the nut is for the purpose of making a fine adjustment of the effective end surface 72 of the nut on a threaded shaft when the nut is used as a stop or otherwise when the location of the surface 72 on the shaft is desired to be very precisely set. In the construction shown in the presently illustrated embodiment a centrally apertured knurled adjusting disc 73 is press fit onto an adjusting screw 74 which is screw threaded on a circumferential shoulder thereof and which threads are complementary to a screw threaded central recess 75 in the end of nut-half 12c. The adjusting screw 74 has a central circular aperture for free fit around the shaft 11a. Rotation of the adjusting disc 73 relative to nut-half 12c thus moves the adjusting disc axially away from or toward the main body of the nut, depending on the angular direction of rotation thereof. An internally threaded centrally apertured cap 76 is secured onto a complementary stepped-down threaded shoulder 77 on the end of nut-half 12c to effectively limit outer axial movement of adjusting screw 74 and thereby limit the axially outward movement of adjusting disc 73. Preferably the threaded recess 75 in the end of nut half 12c is of sufficient depth to permit the disc 73 to be moved axially inward until it is stopped by the axially outer surface of cap 76 without having screw 74 strike the end wall of this recess. A set screw 79 is provided in aligned holes in the sides of cap 76 and nut-half 12c to effectively hold the cap 76 in place and to hold the screw 74 and disc 73 in any desired set position.

In the operation of this embodiment the nut assembly as a unit is first disengaged from the threads of the shaft 11a, slipped to its approximately desired position on the shaft, engaged with the shaft threads at this point, and the vernier disc 73 is then adjusted to precisely position the end surface 72, after which set screw 79 is tightened to secure the nut in its thus final adjusted position.

An illustration of the nut in use as an adjustable stop on a drill press is shown in Fig. 11, in which the immediately preceding described embodiment is being used. It will be apparent, however, that any one of the other embodiments might be similarly used if desired.

Obviously many modifications and variations of the present invention are possible in the light of the foregoing teachings. It is therefore to be understood that within the scope of the appended claims the invention may be practiced otherwise than as specifically described.

Having described the invention, what is claimed is:

A quick change locking nut stop means adapted to be released and slipped along a threaded shaft and relocked in a selected position thereon comprising two main nuts parts, ball and groove means on said parts for securing said parts together for limited relative rotation, said parts being centrally apertured for free sliding movement along the shaft, means for preventing rotary movement of one of said parts on the shaft, the other of said parts being internally enlarged to provide a chamber between said other part and the shaft, a pair of threaded dogs enclosed within the enlarged portion of the other of said parts in mutually spaced relation circumferentially therewithin and having threaded portions engageable in matched threaded relation with said shaft, a pair of diametrically opposed pivot pins secured to said one part and pivotally securing the respective dogs at the heel portion thereof to said one of the parts whereby said threaded portions of the dogs may be swung into and out of said threaded engagement with the shaft, a pair of tension coil springs disposed respectively in the spaces between the dogs for yieldably urging the dogs pivotally in one direction about said pivot pins thereof as the parts are rotated in one direction through said limited movement thereof, each of said springs being connected between the pivot pin of one dog and a toe portion of the other dog remote from the pivot pin thereof, a pair of pins secured to said other part and respectively abutting the ends of the toe portions of said dogs for pivoting the dogs in the opposite direction about said pivot pins as the parts are rotated in the opposite direction through said limited movement thereof, an externally threaded fine adjustment stop member threadedly secured to said one of the parts for axial displacement with respect thereto as the member is threadedly adjusted on said one of the parts, said stop member having a pair of axially spaced abutment surfaces thereon, and a cap sleeved on said member and having a portion extending between said surfaces, said cap being fixed to said one part for limiting axial displacement of said stop member.

References Cited in the file of this patent

UNITED STATES PATENTS

| | | |
|---|---|---|
| 129,706 | Arnold | July 23, 1872 |
| 463,301 | Brandner | Nov. 17, 1891 |
| 844,469 | Prouty | Feb. 19, 1907 |
| 867,351 | Doelp | Oct. 1, 1907 |
| 1,102,686 | Randolph | July 7, 1914 |
| 1,202,678 | Curry | Oct. 24, 1916 |
| 1,338,054 | Vollmer | Apr. 27, 1920 |
| 1,344,544 | Lorenz | June 22, 1920 |
| 1,390,904 | Hazelton | Sept. 13, 1921 |
| 1,539,213 | Shaw | May 26, 1925 |
| 1,740,574 | Christensen | Dec. 24, 1929 |
| 2,138,784 | Cooley | Nov. 29, 1938 |
| 2,491,543 | Alfonso | Dec. 20, 1949 |
| 2,664,768 | Clyne | Jan. 5, 1954 |

FOREIGN PATENTS

| | | |
|---|---|---|
| 598,942 | Great Britain | Mar. 1, 1948 |